No. 773,832. PATENTED NOV. 1, 1904.
G. WESTINGHOUSE.
CONTROLLING SYSTEM FOR ELECTRIC MOTORS.
APPLICATION FILED MAR. 18, 1903.
NO MODEL. 7 SHEETS—SHEET 1.

Fig. 1.

WITNESSES:
C. L. Belcher
J. C. Morse

INVENTOR
George Westinghouse
BY
Wesley G. Carr
ATTORNEY.

No. 773,832. PATENTED NOV. 1, 1904.
G. WESTINGHOUSE.
CONTROLLING SYSTEM FOR ELECTRIC MOTORS.
APPLICATION FILED MAR. 18, 1903.
NO MODEL. 7 SHEETS—SHEET 3.

Fig. 3.

WITNESSES:
C. L. Belcher
J. C. Morse

INVENTOR
George Westinghouse
BY
Wesley G. Carr
ATTORNEY.

No. 773,832. PATENTED NOV. 1, 1904.
G. WESTINGHOUSE.
CONTROLLING SYSTEM FOR ELECTRIC MOTORS.
APPLICATION FILED MAR. 18, 1903.
NO MODEL. 7 SHEETS—SHEET 5.

Fig. 5.

WITNESSES:
C. L. Belcher
J. C. Morser

INVENTOR
George Westinghouse
BY
Wesley G. Carr
ATTORNEY.

No. 773,832. PATENTED NOV. 1, 1904.
G. WESTINGHOUSE.
CONTROLLING SYSTEM FOR ELECTRIC MOTORS.
APPLICATION FILED MAR. 18, 1903.
NO MODEL. 7 SHEETS—SHEET 7.

WITNESSES
J. C. Morse
Birney Hines

INVENTOR
George Westinghouse
by Wesley G. Carr
Att'y.

No. 773,832. Patented November 1, 1904.

UNITED STATES PATENT OFFICE.

GEORGE WESTINGHOUSE, OF PITTSBURG, PENNSYLVANIA.

CONTROLLING SYSTEM FOR ELECTRIC MOTORS.

SPECIFICATION forming part of Letters Patent No. 773,832, dated November 1, 1904.

Application filed March 18, 1903. Serial No. 148,417. (No model.)

*To all whom it may concern:*

Be it known that I, GEORGE WESTINGHOUSE, a citizen of the United States, and a resident of Pittsburg, in the county of Allegheny and State of Pennsylvania, have invented a new and useful Improvement in Controlling Systems for Electric Motors, of which the following is a specification.

My invention relates to multiple-control systems for electric motors and motor-driven vehicles or trains; and it has for its object to provide certain improvements in the construction of the motor-controllers and the governing-switches whereby the apparatus may be rendered more simple and compact in construction and more satisfactorily located than has been feasible with the corresponding parts of like systems—such, for example, as that set forth in Patent No. 624,277, granted to me May 2, 1899, my present invention being an improvement upon that set forth in said patent. In the patent referred to the motor-controllers comprised in the system were of the ordinary drum type and were operated in synchronism by pneumatically-actuated devices, the pneumatic pressure being controlled and applied by electromagnetic means under the control of a governing-switch located at any convenient but usually more or less distant point from the motor-controllers, the said system being combined with an air-brake system, whereby the reservoirs of compressed air which supplied the fluid-pressure for operating the brakes could also be drawn upon for operating the controller-drums, reversing-switches, and circuit-breakers of the system.

In the operation of heavy vehicles and trains, which require the use of large motors and heavy operating-currents, the motor-controllers if of the ordinary drum type, such as are employed in ordinary street-railway work, are necessarily of very large size, such that difficulty is experienced in finding space in which to locate them, and difficulty is also experienced in insulating the contact-pieces and extinguishing arcs which are formed in passing from one position to another, so that the employment of a different type of controller, which is susceptible of more compact arrangement and at the same time one that will be substantially free from injury by reason of arcs, is desirable.

In setting forth my present invention as embodied in a system for controlling electrically-operated vehicles or trains it is to be understood that it is primarily intended for and will generally be found most useful in controlling a plurality of cars coupled together to constitute a train, some or all of which are severally provided with two or more propelling-motors, and also with a controller for such motors and with one or two governing-switches, though in practice only one governing-switch—that is, the one at the forward end of the forward car of the train—will be utilized, it being connected in the system in such manner that all of the motor-controllers of the train will be governed to control the motors of the train in synchronism. There is nothing inherent in the system, however, which precludes its use for controlling a single vehicle, whether equipped with one, two, or more motors or for controlling motors used for other purposes, though the construction of the controller and system, as here specifically set forth, is such as to provide for the control of at least two motors in such manner that they may be connected either in series or in parallel to vary the speed of a vehicle or train.

Referring now to the accompanying drawings, in which I have illustrated my invention as embodied in apparatus designed and adapted for practical service, but which is susceptible of modification as to form and relative location of parts without affecting its mode of operation and result.

As hereinbefore stated, my present invention is an improvement upon that covered by my prior patent, No. 624,277, and the pneumatic features as well as the electric and electromagnetic governing features by means of which the pneumatic pressure is controlled and applied are in many respects set forth in the said prior patent and in patents to E. R. Hill, Nos. 682,828 and 684,609, granted, respectively, September 17, 1901, and October 15, 1901, and reference may therefore be had to these patents for such description of details of circuits and apparatus as is not here given.

My present invention contemplates the employment of independently-actuated switches for coupling the motors in series and in parallel and for varying the resistance of their circuit or circuits in order to vary the speed of the vehicle or train driven thereby, as distinguished from the employment of a controller having a single drum on which are mounted relatively immovable contact-pieces which make coöperative engagement with stationary contact-fingers in order to effect the changes of motor-circuits and variations of resistance therein. Such changes in structure and mode of operation of the motor-controller obviously involve certain material changes in the circuits and governing apparatus therefor, and these will be specifically set forth.

Figure 3:
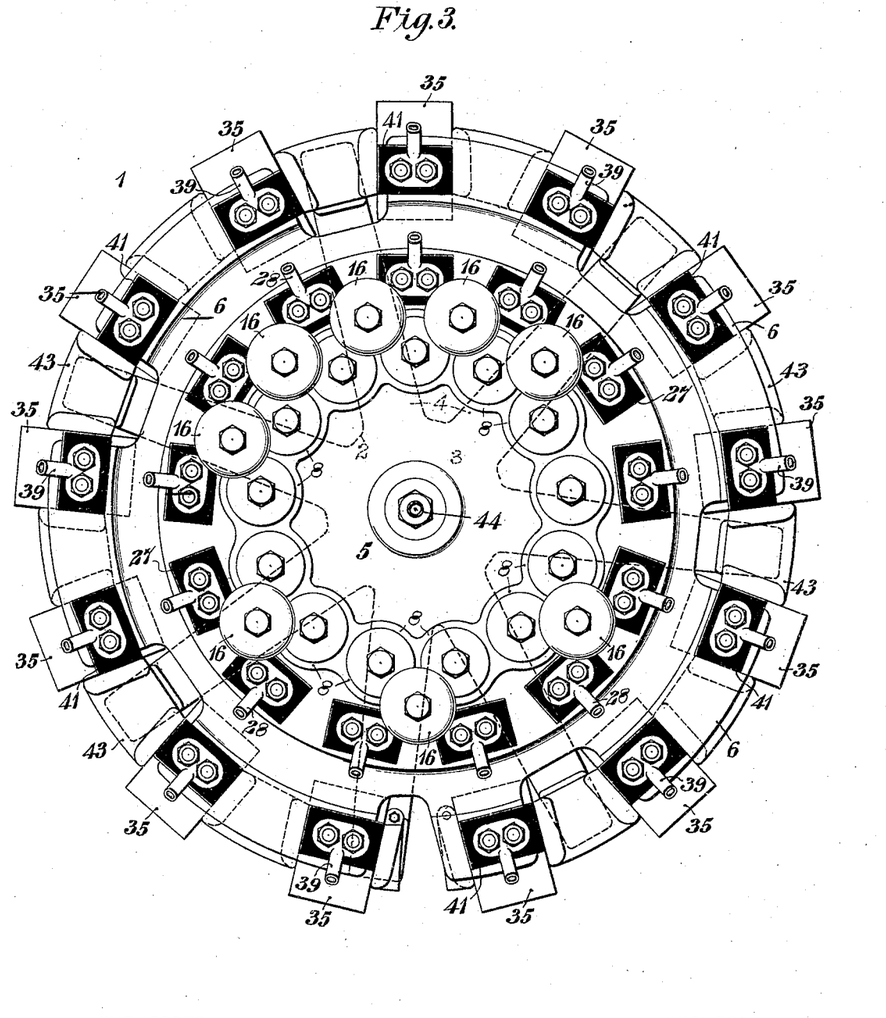
Fig. 3 is a plan view of a motor-controller constructed in accordance with my invention.
Figure 4:
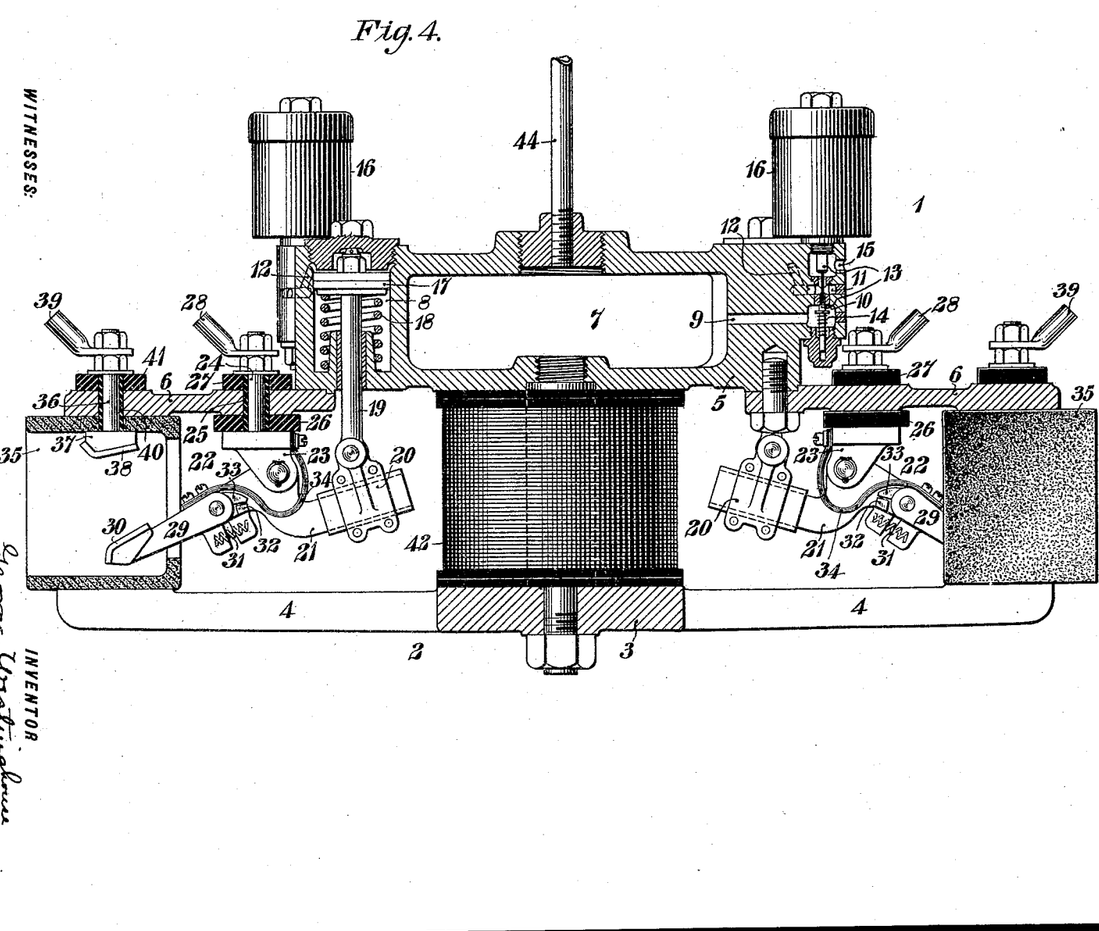
Fig. 4 is a sectional view, on a larger scale, of the controller shown in Fig. 3.
Figure 5:
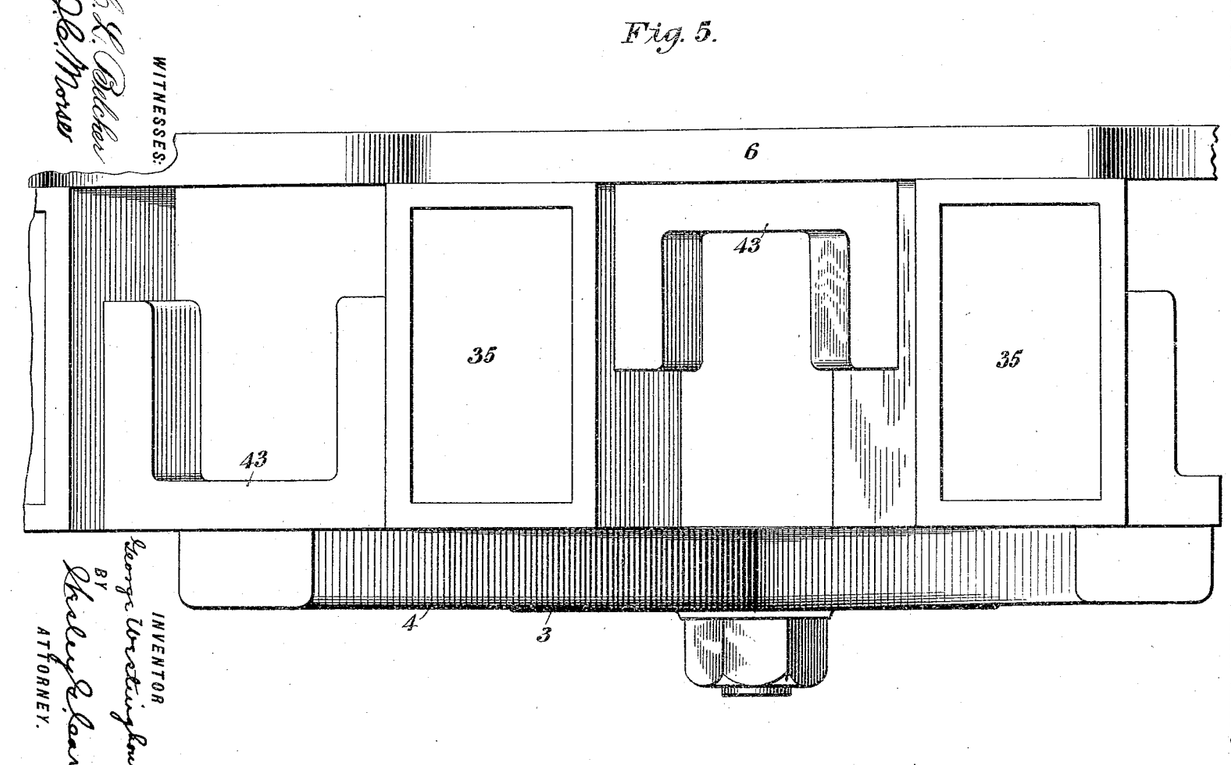
Fig. 5 is a detail side elevation, on a still larger scale, of a portion of the controller shown in Figs. 3 and 4.
Figure 6:
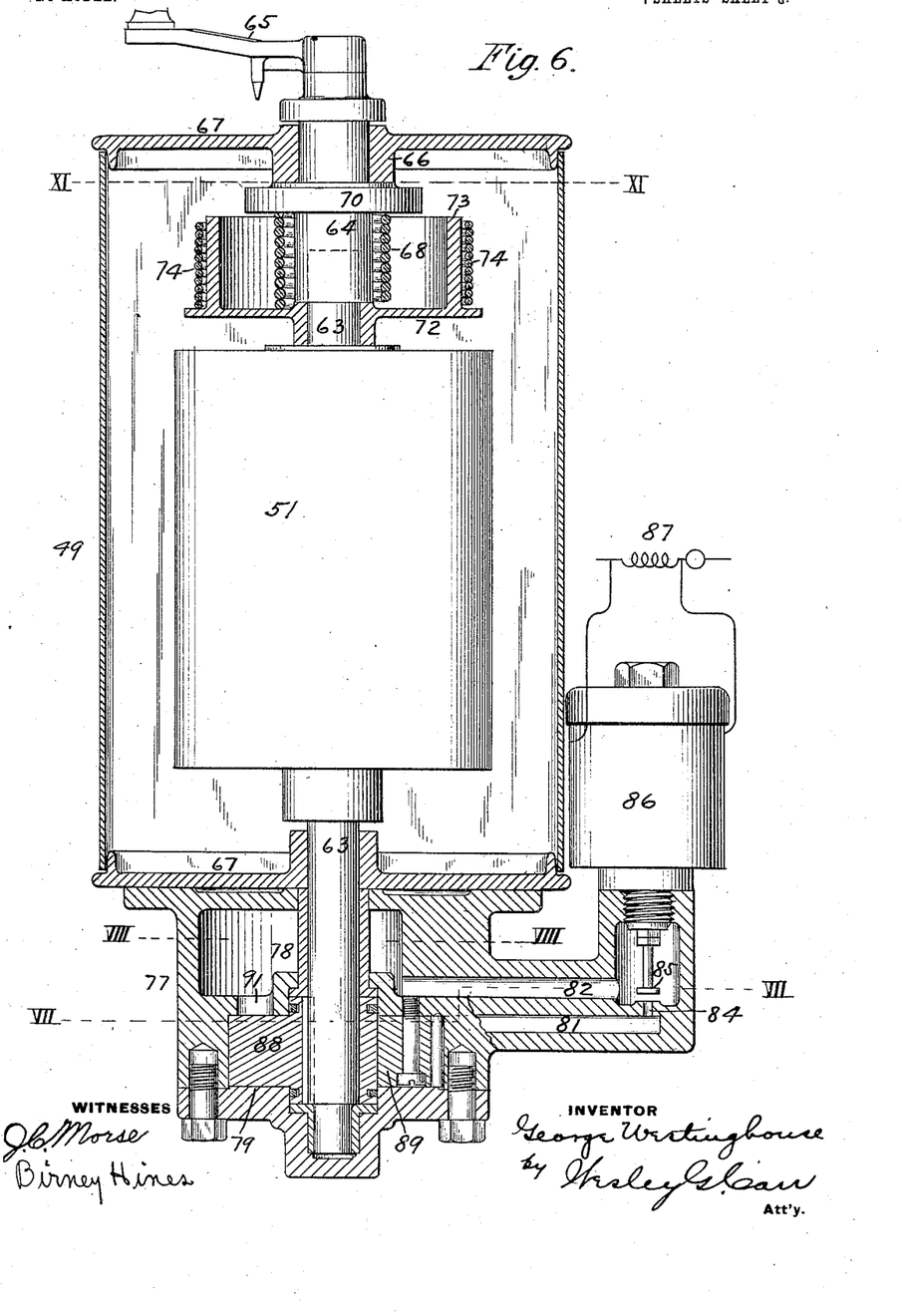
Fig. 6 is a longitudinal sectional view of the master-controller or governing-switch.
Figures 7, 8:
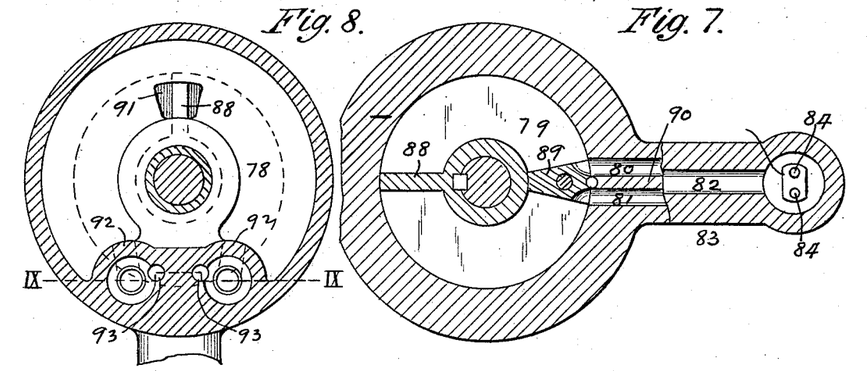
Fig. 7 is a sectional view taken on line VII VII of Fig. 6.
Fig. 8 is a section on line VIII VIII of Fig. 6.
Figure 9:
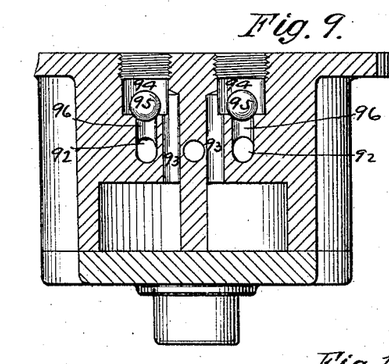
Fig. 9 is a section on line IX IX of Fig. 8.
Figure 10:
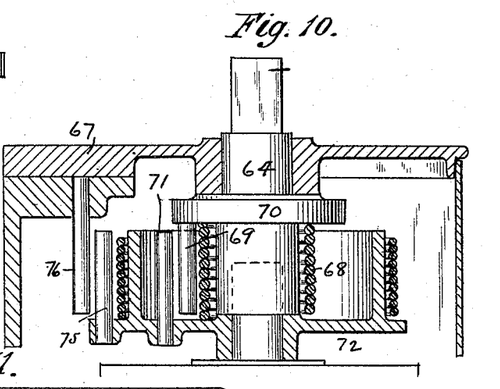
Fig. 10 is a longitudinal section through the upper portion of the governing-switch, the section being taken at right angles to that of Fig. 6.
Figure 11:
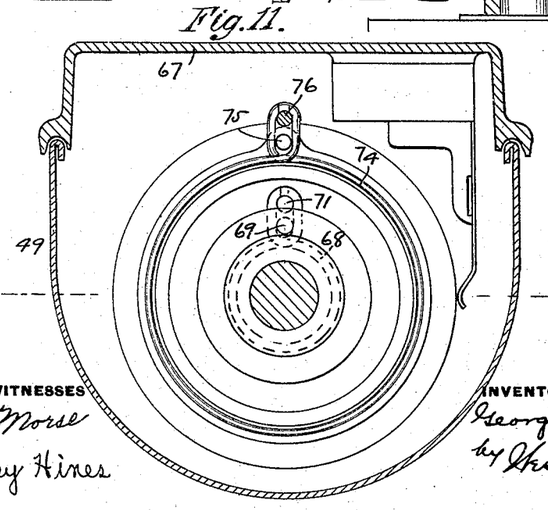
Fig. 11 is a transverse section on line XI XI of Fig. 6.

While the structure of the motor-controller may be made to assume widely-varying forms, dimensions, and coöperative relations of parts within the scope of operative conditions, I have devised a compact and satisfactory operative combination, which I have illustrated in Figs. 3, 4, and 5 and which will be now described, without intention, however, of limiting the invention to specific details of construction.

As here shown, the motor-controller 1, which may be located beneath a car or in any other convenient place, has a frame comprising a base-piece 2, in the form of a spider having a central hub 3 and radiating arms 4, a front casting 5 and an annular plate 6, bolted to the casting, all of said parts being made of iron or steel. The casting 5 has a central air-chamber or reservoir 7 and a plurality of annularly-arranged cylinders 8, the number of which may be varied to suit the conditions of service; but in the present instance I have shown thirteen such cylinders. These cylinders 8 are severally connected with the central chamber or reservoir 7 by means of passages 9, 10, 11, and 12, controlled by a double valve 13, that is normally held in position to prevent the passage of air from the central chamber 7 to the cylinder 8 by means of a coiled spring 14 and to permit the air to exhaust from the cylinder 8 to the atmosphere through a port 15. Each valve is moved in the opposite direction to close the exhaust-port and to open the passages between the central chamber and the cylinder by means of an electromagnet 16, the structure and mode of operation of which, as well of the structure, mode of operation, and general arrangement of the valves, ports, and passages just referred to, are fully set forth in the patents hereinbefore mentioned. (See, for example, Fig. 3 of Patent No. 624,277.) The number of electromagnets 16 may be equal to or less than the number of cylinders 8, according to the arrangement of circuits, the number of magnets in the present instance being eight, whereas there are thirteen cylinders. The reason for this arrangement and the relation whereby it is made effective will be hereinafter more fully described.

Each cylinder 8 contains a piston 17, that is normally held in its outermost position by means of a coiled spring 18, which acts in opposition to the fluid-pressure and is provided with a piston-rod 19, the free end of which is pivotally connected to a clamping-collar 20, that is fastened to the outer or free end of an arm 21 of a switch 22. This arm 21 is pivoted between ears 23, which are fastened to or constitute an integral part of a bolt 24, which is mounted in the annular plate 6 and is insulated therefrom by means of a sleeve 25 and two washers 26 and 27 of non-conducting material. The bolt 24 constitutes a binding-post, to the outer end of which is attached a terminal piece 28. The outer end of the arm 21 is pivotally connected to one end of an arm 29, having a contact-shoe 30, of copper or other good conducting material, the adjacent portions of these two arms being normally in substantial alinement and held in that position by means of a spring 31 and two limiting-stops 32 and 33, one on each of the members. The ears 23, which constitute parts of the inner end of the binding-post 24, are connected to the arm 29 by means of flexible copper strips 34, so as to insure a good conducting path for the current.

Rigidly clamped to the outer edge of the ring or annular plate 6 are boxes or chambers 35 of non-conducting and preferably refractory material—such, for example, as pressed asbestos—these being clamped in position by means of bolts 36, the inner ends or heads 37 of which are provided with shoes or contact-plates 38, of copper or other good conducting material, and the outer ends of which are provided with terminal pieces 39. These bolts are insulated from the plates 6 by insulating-sleeves 40 and washers 41.

Clamped centrally between the casting 5 and the spider-hub 3 is a blow-out magnet 42. Since the arms of the spider project radially from one pole of the magnet and the casting 5 and annular plate 6 bear substantially the same relation to the other pole, the lines of force mainly follow these paths instead of taking a short path from pole to pole through the air.

In order that the blow-out magnet 42 may exercise its function with maximum effectiveness when the contact members of the switches are separated, I suitably fasten to the annular plate 6 and to the spider-arms 4 alternately U-shaped pole-pieces 43, (see Fig. 5,) which project between the chambers 35 such distances that the magnetic lines of force will pass directly through the boxes or chambers 35 and transversely between the contact members of the switches as they are separated, and thus serve in the most effective manner to interrupt any arcs which may be formed.

The central chamber 7 is connected to a source of compressed air, as will be more fully hereinafter described, by means of a pipe 44.

It will be understood that the movable members of the switches 22 will be thrown to open position and be held in that position by the corresponding coiled springs 18, acting upon the pistons 17, except when the valves 13 are operated by means of the electromagnets 16 to admit compressed air into the cylinders 8 from the central chamber 7 to compress the springs and move the movable members of the switches into circuit-closing position. By reason of the hinge connection between the two parts 21 and 29 of these movable members the outer ends of the contact-shoes will first come into engagement, and further pressure will compress the spring 31 between the two parts, and thus effect a sliding movement of the movable contact-plate 30 upon the stationary plate 38, thus serving to keep the surfaces clean and smooth and insure good contact. On the other hand, when the switches are opened the same sliding movement will take place and the final break will be at the outer ends of the contact-shoes.

Figure 1:
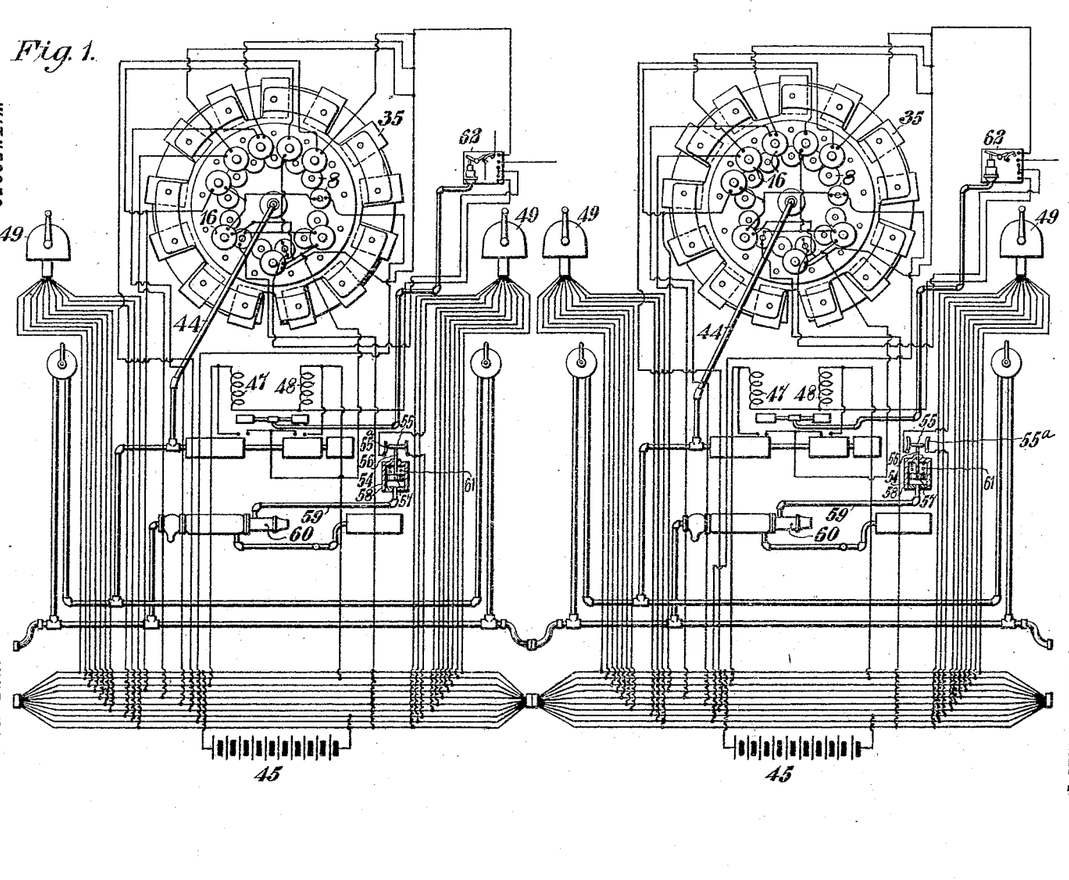
Figure 1 is a diagram of the controlling apparatus and circuits for two connected vehicles indicative of two motor-cars of a train comprising any practicable number of vehicles.

The governing-magnets 16 are energized by means of current from a suitable source, a secondary battery 45 being indicated in Fig. 1 as such source, and such a battery of comparatively small size will be suitable and sufficient for the purpose, since a comparatively small amount of energy is necessary to actuate the magnet-armatures and the valves connected thereto. In order that the magnets may be energized and deënergized in the proper order to insure operation of the switches, so as to first connect the motors in series with each other and with resistance, then to gradually cut out the resistance, then to connect the motors in parallel with resistance in circuit therewith, and, finally, to cut out the resistance and leave the motors in parallel without resistance, or to provide such of these changes as may be desired to secure a speed which is less than the maximum speed, I provide a governing-switch or master-controller, the casing of which is shown in outline in Fig. 1, the contact portions and circuit connections of which are shown diagrammatically in Fig. 2, and the structural details of which are shown in Figs. 6 to 11.

In order that the vehicle or train may be operated in either direction at will, I provide a reversing-switch 46, which may be operated pneumatically and the application of pneumatic pressure to which may be governed by electromagnets 47 and 48, the essential structural features of such reversing-switch being illustrated in the patents hereinbefore mentioned.

The governing-switch or master-controller 49 is shown as provided with one set 50 of stationary contact-fingers, two of which are connected to the reversing-switch magnets 47 and 48 and others to the several magnets 16 of the set pertaining to the controller proper, as will be hereinafter more specifically described, and the drum 51, which coöperates with such fingers, is provided with two sets 52 and 53 of contact pieces or strips, so connected and arranged that if the drum is rotated in one direction it will first effect a movement of the reversing-switch in a corresponding direction and will then energize the controller-magnets in such order as to connect the motors and vary the resistance in the motor circuit or circuits in accordance with the desired speed variations. If the said governing-switch or master-controller is operated in the opposite direction, it will correspondingly first effect the operation of the reversing-switch and then energize the motor-controller magnets in such order as to connect the motors and vary the resistance of their circuit or circuits in accordance with the desired speed variations. The circuit changes which are actually effected by the means here shown will be hereinafter more particularly specified.

The fluid-pressure for operating the switches may be derived from any suitable source; but if the vehicle or train is equipped with air-brakes, as will usually be the case and as is illustrated in Fig. 1 of the drawings, the main reservoir or a supplemental reservoir of the system may be connected directly to the air-chamber 7 by means of a pipe 44 and a suitable reducing-valve, if necessary, so that the desired pressure may be always available for the operation of the switches. Since the switches are closed only when the corresponding magnets are energized, any failure of battery-current by reason of disability of the battery itself or by reason of a break anywhere in its circuit will serve to instantly cut off the power from the motors, and, furthermore, the governing-switch or master-controller will be automatically returned to zero or off position when released, and thus insure the opening of the power-circuit, as will be hereinafter described.

The air-brake apparatus being well known in the art and being fully set forth in the patents hereinbefore mentioned need not be here described; but I have shown a modified means for effecting the interruption of the power-circuit when the brakes are applied, although I do not claim this specific feature as of my present invention.

The battery-circuit is here shown as having a switch 54, the movable member 55 of which is mounted upon the rod 56 of a piston 57, the cylinder 58 of which is connected, by means of a pipe 59, to the brake-cylinder 60, and the cylinder of which is also provided with a coiled spring 61, which serves to normally hold the switch closed. When the brakes are applied, the air will be admitted to the cylinder 58 through the pipe 59, thus forcing the piston 57 upward against the action of the coiled spring 61, and thus separate the movable contact from the stationary contacts 55$^a$ of the switch, thereby opening the battery-circuit and deënergizing any of the magnets 16 which may be energized at the time by reason of the position of the governing-switch. I have shown also a circuit-breaker 62, which may be of any suitable construction and be properly connected to the air and electric circuits in substantially the manner set forth in any of the patents hereinbefore mentioned, so as to open the power-circuit under such conditions as usually demand such action.

In the system set forth in the patents hereinbefore mentioned means more or less independent of the movements of the governing-switch were employed for insuring a reasonably slow movement of the motor-controller from its "off" to its "full-on" position. In the use of the present form of motor-controller it is desirable that the movement of the governing-switch or master-controller be graduated so as to secure the desired slow and regulated speed at which the circuit-changes are made, and thus gradually accelerate the speed of the motors.

Various means may be employed for regulating the movement of the governing-switch; but as one specific means for effecting this result I have devised the construction shown in Figs. 6 to 11, inclusive, which will be now described. The drum 51 of the governing-switch 49 is mounted upon a shaft 63, the upper end of which has a bearing in a short shaft 64, that is operated by means of a suitable handle 65 and is journaled in a bearing 66 in a frame 67. The shafts 63 and 64 are connected together by means of a coiled spring 68, one end of the spring being fastened to a pin or stud 69, projecting from a collar 70 on the shaft 64, and the other end being attached to a similar pin or stud 71, projecting from a flange 72, with which the drum-sleeve is provided at its upper end. This flange 72 is provided near its outer edge with a drum 73, on which is coiled a second spring 74, one end of which is fastened to a pin or stud 75, projecting from the outer edge of the flange, and the other end of which is attached to a similar pin or stud 76, projecting from the frame 67. It follows from this construction that the shaft may be turned by means of the operating-handle without turning the switch-drum, provided the latter is held against movement, the movement of the shaft thus serving to place the spring under tension or compression, according to the direction of movement of the handle. As the drum and its sleeve are turned when released, their movement serves to place the outer spring 74 under tension or compression, so that if the handle is released when the inner spring 68 is not held under tension or compression the outer spring will serve to return the drum to its zero or initial position. Mounted upon the lower end of the frame 67 and outside the same is a supplemental frame 77, having two chambers 78 and 79, one above the other, which are connected through two lower passages 80 and 81 and a single upper passage 82 in a laterally-projecting arm 83 and small ports 84 at the ends of the same, above which is located a valve 85. The valve 85 is mounted upon the stem of the armature of an electromagnet 86, which may be of substantially the same construction as those hereinbefore described and which may have its winding connected to the power-circuit, preferably across the field-magnet winding 87 of one of the motors, as indicated, so that in case the current flowing through the motor-circuit becomes excessive the magnet will draw down its armature and close the ports 84 by means of the valve. Attached to the lower end of the shaft 63, so as to extend completely across the annular chamber 79, is a plate-piston 88, and opposite this piston when in its zero position is a partition 89, which is a continuation of a partition 90 between the two passages 80 and 81. When the governing-switch is in its off or zero position, the piston 88 is immediately below a port 91 in the wall between the supply-chamber 78 and the piston-chamber 79, which is of materially greater width than the piston, so that as the piston is moved in either direction it may be moved a distance corresponding to two controller-notches without substantial resistance from the liquid with which these chambers are filled; but after the edge of the port has been passed by the piston the resistance of the liquid on account of the small size of the ports 84 at the outer ends of the passages 80, 81, and 82 will serve to retard the movement of the drum, the rate of retardation being readily predetermined and adjusted by making the ports 84 of the proper size. This retarding movement of the drum will of course continue until it has completed its movement in the one direction or the other unless the current in the motor-circuit becomes so large as to close the ports 84, in which case the movement of the drum will be stopped or further retarded until the current falls to a safe limit, and thus permits the valve 85 to open the ports 84. In order that the movement of the drum may not be retarded in its return course when the handle is released, I provide passages 92 and 93, leading, respectively, from the upper and the lower chambers at each side of the partition 89 to valve-chambers 94, in which are located ball-valves 95, that close the ports 96 between the passages 92 and the valve-chambers against the flow of liquid through said passages from the piston-chamber to the supply-chamber, but permit the liquid to flow freely in the reverse direction. It follows, therefore, that after the controller-drum passes the second notch in its movement away from its zero position it can operate at only the speed permitted by the rate of flow of the liquid through the ports 84; but its movement toward its zero position is substantially unimpeded, since the liquid is free to flow into the supply-chamber through the port 91 and back to the piston-chamber through passage 92, port 96, chamber 94, and passage 93.

Figure 2:
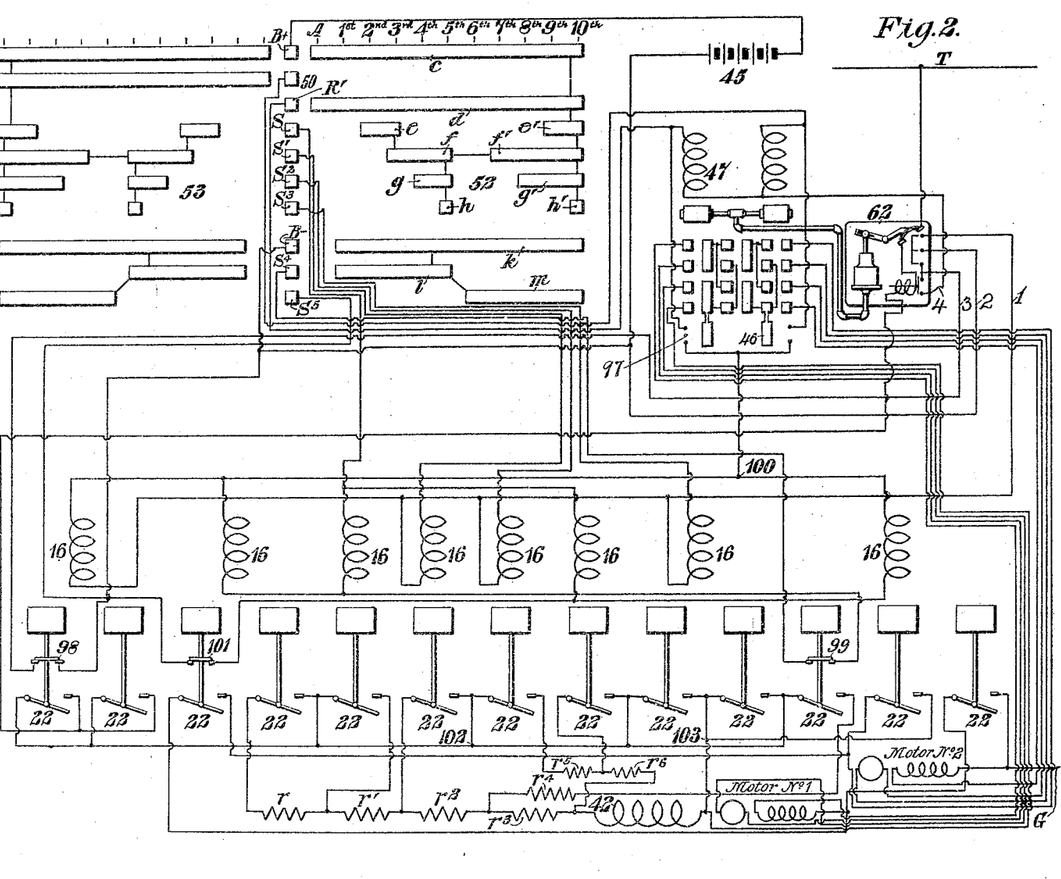
Fig. 2 is a diagram of power and motor controlling circuits and apparatus for one equipment comprising two motors and accessory apparatus.

A brief description will now be given of the circuits and circuit changes whereby the speed of the vehicle or train is regulated. Since the master-controller effects the same circuit changes when it is operated in the one direction from its zero position as when it is operated in the other direction, except as regards its action upon the reversing-switch, it will be unnecessary to describe the operation except for one direction of movement from the zero position. Assuming then that the handle is operated so as to move the drum to bring the set of contacts 52 successively into engagement with the corresponding fingers in position A, the current from the battery enters at finger B+, passes through strips $c$ and $d$, leaves the controller through finger R', goes through coil 47 of the reversing-switch, through the circuit-breaker, through the switch 98 back to the battery. The energizing of the coil 47 of the reversing-switch operates a valve, as set forth in the patents hereinbefore mentioned, in such manner as to cause the reversing-switch to be thrown to a position corresponding to the direction in which the operator wishes the car or train to move. At the same time the circuit is closed at 97, thus providing a path around the reversing-switch magnet 47, through the first magnet-coil 16 and the circuit-breaker back to the battery. When the current passes through the first magnet-coil 16, it operates the first two switches 22 and opens the switch 98 in order to break the circuit through the reversing-switch magnet-coil 47. This position of the controller is utilized only for throwing the reversing-switch so as to obtain the proper connections through it for the motors. In the first position the circuit described for position A is maintained, and in addition thereto there is now established another circuit from the battery through finger B+, drum-contacts $c$ and $d$, finger R', switch 97, the second magnet-coil 16, switch 99, controller-finger $S^4$, drum-contacts $l$ and $k$, and finger B— to the battery. The second magnet 16 operates the third and fourth switches 22, and the power-current flowing from the collector T through the circuit-breaker 62 has two parallel paths through the first and second switches 22, then passes through the fourth switch 22, resistances $r$, $r'$, $r^2$, and $r^3$, the blow-out magnet-coil, motor No. 1, the third switch 22, and motor No. 2 to ground, (represented at G.) It is to be understood that for every operating position of the controller the power-current passes through the reversing-switch; but since this is a condition that obtains in all controllers and controller systems for railway-vehicles the description will be simplified by tracing the circuits without reference to the reversing-switch, it being obvious that after the reversing-switch is once thrown it does not in any way vary the circuits. In the second position in addition to the above-described circuits there is now another circuit from the battery through finger B+, drum-contacts $c$, $d$, $e'$, $f'$, $f$, and $e$, finger S, the third magnet-coil 16, switch 99, finger $S^4$, drum-contacts $l$ and $k$, and finger B— to the battery. The third magnet 16 closes the fifth switch 22 and the main current then flows through the first and second switches 22 in parallel, the fifth switch 22, resistances $r'$, $r^2$, and $r^3$, the blow-out magnet-coil, motor No. 1, the third switch 22, and motor No. 2 to ground. In the third position the additional circuit is through finger B+, drum-contacts $c$, $d$, $e'$, $f'$, and $f$, finger S', the fourth coil 16, the circuit-breaker and back to the battery. The fourth magnet-coil 16 closes the sixth switch 22, and the power-circuit is the same as in the second position, except that an additional resistance $r'$ is cut out of circuit. In the fourth position beside the circuits corresponding to position A and the first and third positions a new circuit is now established through finger B+, drum-contacts $c$, $d$, $e'$, $f'$, $f$, and $g$, finger $S^2$, the fifth magnet-coil 16, and the circuit-breaker back to to the battery. The drum-contact $e$ no longer engages with finger S, and the fifth switch 22 opens. The power-current now flows through the first and second switches 22 in parallel, the seventh switch 22, resistances $r^5$ and $r^6$, the blow-out coil, motor No. 1, the third switch 22, and motor No. 2 to ground. In the fifth position the new circuit is through finger B+, drum-contacts $c$, $d$, $e'$, $f'$, $f$, $g$, and $h$, finger $S^3$, the seventh magnet-coil 16, and the circuit-breaker to the battery. The seventh magnet-coil 16 closes the ninth and tenth switches 22, and the power-current flows through the first and second switches 22 in parallel, also the ninth and tenth switches 22 in parallel, through motor No. 1, the third switch 22, and motor No. 2 to ground, the motors being in simple series without resistance in circuit. In the sixth position the controller-circuit is through finger B+, drum-contacts $c$ and $d$, finger R', and switch 97. At point 100 the current divides, one path being the same as that for position A and the other path being through the eighth magnet-coil 16, switch 101, finger $S^5$, drum-contacts $m$, $l$, and $k$, and finger B— to the battery. By the action of the eighth magnet-coil 16 the eleventh, twelfth, and thirteenth switches 22 are closed, and the power-current flows through the first and second switches 22 in parallel, the eleventh switch 22, resistances $r^4$ and $r^3$, and the blow-out coil, where it divides, one part going through motor No. 1 and the thirteenth switch 22 to ground and the other part going through the twelfth switch 22 and motor No. 2 to ground, the motors being therefore in parallel. In the seventh position besides the controller-circuit utilized in the sixth position another circuit is established through finger B+, drum-contacts $c$, $d$, $e'$, and $f'$, finger S', the fourth magnet-coil 16, and the circuit-breaker to the battery. The power-current divides at point 102, one part taking the same path as was described for the sixth position and the other part going through the sixth switch 22 and resistance $r^2$, when it again unites with the other branch. The remainder of the circuit is the same as described for the sixth position. In the eighth position the additional controller-circuit is from the battery through finger B+, drum-contacts $c$, $d$, $e'$, $f'$, and $g'$, finger $S^2$, the fifth magnet-coil 16, and the circuit-breaker to the battery. The fifth magnet-coil 16 closes the seventh switch 22. The power-current, therefore, now flows through the seventh switch 22, resistances $r^5$ and $r^6$, the blow-out coil, and then through the motors in parallel, as described for the sixth position. In the ninth position the controller-circuit is from the battery, through finger B+, drum-contacts $c$, $d$, and $e'$, finger S, the sixth magnet-coil 16, switch 101, finger $S^5$, drum-rings $m$, $l$, and $k$, and finger B—, to the battery. The sixth magnet 16 closes the eighth switch 22, and the power-current therefore flows through the eighth switch 22, resistance $r^6$, and the blow-out coil and then through the motors in parallel, as before. In the tenth position the battery-circuit is through finger B+, drum-contacts $c$, $d$, $e'$, $f'$, $g'$, and $h'$, finger $S^3$, the seventh magnet-coil 16, and the circuit-breaker to the battery. The ninth and tenth switches 22 are closed by the seventh magnet-coil 16, and the power-current therefore flows through them in parallel to point 103, where it divides, one part going through motor No. 1 and the thirteenth switch 22 to ground and the other part going through the twelfth switch 22 and motor No. 2 to ground, the motors in this position being therefore connected in parallel without resistance.

Variations from what is shown and described as regards the number of motors, the number of resistance-sections, the number and arrangement of switches, and other features of the system may of course be made without departing from my invention, and I therefore desire it to be understood that only such limitations are to be placed upon the invention as may be imposed by the prior art.

I claim as my invention—

1. In a controlling system for electric motors, the combination with a plurality of annularly-disposed and independently-actuated contact members, of a centrally-located air-chamber, pneumatically-actuated means for moving each member into its circuit-closing position, means for moving each of said members to open-circuit position when released from pneumatic pressure, electromagnetically-actuated valves for applying and withdrawing pneumatic pressure and a governing-switch for energizing and deënergizing the valve-actuating magnets in a predetermined order.

2. In a multiple controlling system for electric motors, the combination with a plurality of annularly-disposed and independently-actuated contacts for changing the grouping of the motors and the resistance of their circuits, of a centrally-located air-chamber, pneumatically-actuated means for said contacts, magnetically-actuated valves for applying and withdrawing the pneumatic pressure and a governing-switch for energizing and deënergizing the valve-actuating magnets in a predetermined order.

3. In a controlling system for electrically-propelled vehicles or trains, the combination with a plurality of motors, of a plurality of annularly-disposed and independently-actuated contacts for connecting said motors in series and in parallel and varying the resistance of their circuits, a centrally-located air-chamber, pneumatically-actuated means for moving the several contacts to circuit-closing position, means for moving the said contacts to open-circuit position when relieved from pneumatic pressure, electromagnetically-actuated valves for applying and withdrawing said pneumatic pressure and a governing-switch for energizing and deënergizing the valve-actuating magnets in a predetermined order.

4. In a multiple control system for electrically-propelled vehicles or trains, the combination with a set of annularly-disposed and independently-actuated switches for varying the motor-circuits, a centrally-located air-chamber, pneumatically-actuated devices for closing said switches and springs for opening the same, of electromagnetically-actuated valves for applying and withdrawing the fluid-pressure and a governing-switch for energizing and deënergizing the valve-actuating magnets in a predetermined order.

5. In a multiple control system for electrically-propelled vehicles or trains, the combination with a plurality of annularly-disposed and independently-actuated switches for varying the connections and resistance of the motor-circuits, of a centrally-located air-chamber, pneumatically-actuated means for closing said switches and springs for opening the same when relieved from pneumatic pressure, electromagnetically-actuated valves for applying and withdrawing said pneumatic pressure and a manually-operated governing-switch for energizing and deënergizing the valve-actuating magnets in a predetermined order.

6. In a multiple control system for electrically-propelled vehicles or trains, a motor-controller comprising a frame having a centrally-located blow-out coil, a compressed-air chamber, a series of circuit making and breaking switches, a series of cylinders having pistons connected to the movable members of said switches and electromagnetically-actuated valves for admitting air from said air-chamber to said cylinders and exhausting the same therefrom.

7. In a controller for electric motors, a plurality of independently-actuated contacts and a single blow-out magnet centrally located with reference to said contacts and having pole-pieces that project alternately from the poles of the magnet between adjacent contacts.

8. In a controller for electric motors, the combination with a plurality of annularly-disposed contacts, of a centrally-located blow-out magnet having pole-pieces which project between adjacent contacts.

9. In a controller for electric motors, the combination with a frame having a plurality of annularly-disposed chambers and a blow-out magnet having pole-pieces projecting between adjacent chambers, of a plurality of independently-actuated switches the contact parts of which are located in said chambers.

10. In a controller for electric motors, the combination with a frame having a central blow-out magnet, pole-pieces and a plurality of chambers between which said pole-pieces project, of independently-actuated switches the contact members of which are located in said chambers.

11. In a controller for electric motors, the combination with a frame, a centrally-located blow-out magnet and a plurality of annularly-disposed chambers, of a plurality of independently-actuated switches the contact members of which are severally located in said chambers and a plurality of pole-pieces projecting alternately between adjacent chambers.

12. In a controller for electric motors, the combination with a frame having a central blow-out magnet and a plurality of annularly-disposed chambers between which the pole-pieces of said magnet project, of a plurality of switches the contact members of which are severally located in said chambers, a plurality of cylinders and pistons the latter of which are severally connected to said switches and means for applying fluid-pressure to said cylinders independently and withdrawing the same therefrom.

13. In a controller for electric motors, a magnetizable frame having a compressed-air reservoir and a set of cylinders provided with pistons, in combination with a plurality of chambers and a plurality of switches the contact portions of which are in said chambers and the movable members of which are operatively connected to said pistons.

14. In a controller for electric motors, a frame comprising a magnetizable spider and a circular casting having a ring-plate extension and having a blow-out magnet clamped centrally between the spider and casting and a plurality of boxes clamped between the spider-arms and the ring-plate extension, in combination with a series of independently-actuated switches the contact members of which are located in the said boxes, means for applying pneumatic pressure to the movable members of said switches to close the same and means for moving said members to open-circuit position when released from pneumatic pressure.

15. In a controller for electric motors, a frame comprising a circular casting having a central air-chamber, a plurality of cylinders surrounding the same and a ring-plate extension and a spider in combination with a blow-out magnet clamped centrally between the casting and the spider, a set of boxes clamped between the spider-arms and the ring-plate extension, a set of switches the contact members of which are located in said boxes, pistons located in said cylinders and connected to the movable members of the switches, means for admitting air from the air-chamber to said cylinders and for exhausting the same therefrom and means for moving the pistons to open the switches when the air is exhausted from the cylinders.

16. In a controller for electric motors, a magnetizable frame having two generally circular members, a blow-out magnet clamped centrally between said members, a set of boxes clamped between the outer edges of said members and pole-pieces projecting alternately from said members between adjacent boxes, in combination with a set of independently-actuated switches the contact members of which are located in said boxes, means actuated by pneumatic pressure to close said switches and springs operating to open the same when the pneumatic pressure is withdrawn, electropneumatically-actuated valves for applying and withdrawing pneumatic pressure and a governing-switch for energizing and deënergizing the valve-operating magnets in a predetermined order.

17. In a master-controller for multiple-control systems, the combination with a drum and an operating-handle therefor, of a resilient, lost-motion connection between said parts, a dash-pot for retarding the movement of the controller and means actuated by excessive current in the motor-circuit for further retarding or stopping the movement of the drum.

18. In a controller, the combination with a drum, an operating-handle and a lost-motion, resilient connection between said parts, of two liquid-containing chambers connected by ports and passages, a piston in one of said chambers and connected to the controller-drum and means operated by an excessive current in the motor-circuit to stop or materially impede the movement of the drum during the time that such excessive current continues to flow.

19. In a controller for electric motors, the combination with a drum, an operating-handle and a spring connecting said parts and having such a range of movement as will permit the controller-handle to operate through its entire range of movement without carrying the drum with it, of a dash-pot having two liquid-containing chambers connected by ports and passages, a piston connected to the drum and located in one of said chambers and means for stopping or materially retarding the flow of liquid from the piston-containing chamber to the other when the current in the motor-circuit becomes excessive.

20. In a controller, the combination with a drum, an operating-handle and a spring connection between said parts, of a dash-pot comprising two liquid-containing chambers, a piston connected to the drum-shaft and located in one of said chambers, means for permitting a restricted flow of liquid when the piston is moved away from its zero position and means for permitting a free flow of liquid when the piston is moved toward its zero position.

21. In a controller, the combination with a drum, an operating-handle therefor and a spring connection between said parts, of a retarding means for the drum comprising two liquid-containing chambers, a piston connected to the drum-shaft and located in one of said chambers, a port between said chambers and extending both sides of the piston when in its zero position, means for permitting a restricted flow of liquid from the piston-chamber to the adjacent chamber when the piston is moved away from its zero position and means for permitting liquid to flow freely in the opposite direction when the piston is moved toward its zero position.

22. In a controller, the combination with a movable circuit-changing member, an operating-handle and a spring connection between said parts, of retarding means for said member comprising a revolving piston attached thereto, two liquid-containing chambers in one of which said piston is located, ports and passages between the said chambers for permitting a slow movement of the piston away from its zero position and a rapid movement toward its zero position and a spring for returning the piston and the movable member of the controller to zero position when released.

23. In a controller, the combination with a drum, an operating-handle therefor, a spring connection between said parts and a spring tending to return the drum to and hold it in zero position, of a retarding means comprising a revolving piston attached to the drum-shaft, a liquid-containing chamber for said piston, a supply-chamber and ports and passages between said chambers arranged to permit a restricted flow of liquid when the piston is moved from its zero position and a free flow of liquid when the piston is moved toward its zero position.

In testimony whereof I have hereunto subscribed my name this 12th day of March, 1903.

GEO. WESTINGHOUSE.

Witnesses:
JAMES B. YOUNG,
BIRNEY HINES.